United States Patent [19]

Klös-Hein

[11] Patent Number: 4,743,986
[45] Date of Patent: May 10, 1988

[54] INSERTION-EJECTION MECHANISM IN A MAGNETIC TAPE-CASSETTE APPARATUS

[75] Inventor: Karl Klös-Hein, Ruttershausen, Fed. Rep. of Germany

[73] Assignee: U.S. Philips Corp., New York, N.Y.

[21] Appl. No.: 798,645

[22] Filed: Nov. 15, 1985

[30] Foreign Application Priority Data

Nov. 15, 1984 [DE] Fed. Rep. of Germany ....... 3441804

[51] Int. Cl.$^4$ ...................... G11B 5/008; G11B 15/00; G11B 17/00
[52] U.S. Cl. .................................. 360/96.5; 360/96.1; 360/71
[58] Field of Search .................... 360/97–99, 360/133, 71, 74.1, 96.5, 96.1–96.4

[56] References Cited

U.S. PATENT DOCUMENTS 3,789,273 1/1974 O'Brien .................. 360/97
4,413,291 11/1983 Ueki et al. ............. 360/71
4,620,249 10/1986 Suzaki et al. ........ 360/99 X Primary Examiner—John H. Wolff
Assistant Examiner—Alfonso Garcia
Attorney, Agent, or Firm—David R. Treacy

[57] ABSTRACT

A cassette transport lever is engaged by a cassette being inserted into the apparatus, for movement of the lever to an operating position; and upon subsequent reverse movement of the lever for ejecting the cassette. Upon movement of the lever to the operating position the lever engages a switch for turning on a motor which drives a control rod for controlling other apparatus functions. During ejection, guide surfaces on the control rod engage a delay element which holds the switch in the position for maintaining the motor turned on until the cassette is ejected past the position in which the motor was turned on during insertion. Upon the cassette reaching a second position, the guide surface releases the delay element so that the motor may be turned off. During insertion, the delay element engages a different portion of the guide so that the motor is only turned on when the ejection lever has been sufficiently rotated.

15 Claims, 13 Drawing Sheets

INSERTION-EJECTION MECHANISM IN A MAGNETIC TAPE-CASSETTE APPARATUS

BACKGROUND OF THE INVENTION

The invention relates to a control device in a magnetic-tape cassette apparatus, comprising an axially movable control rod which over a part of its travel co-operates with a lever for loading and ejecting the cassette, which lever co-operates with a switching arm of an electrical switch by means of a switching projection, which switch is set to an activated position at the beginning of the loading movement and starts the motor drive for the control rod and is set to a deactivated position during the ejection movement to enable the motor drive to be stopped.

Such a magnetic-tape cassette apparatus is disclosed in German Offenlegungsschrift No. 33 15 822, to which U.S. Pat. No. 4,573,088 corresponds. This apparatus employs a switching device which is actuated by a transport lever when a cassette is manually inserted and is de-activated after the transport lever has reached its end position during ejection of the cassette. When the drive mechanism is switched off it must be ensured that the cassette has been ejected far enough to permit easy removal by hand. After switching off the motor of the drive mechanism rotates slightly further, so that the cassette is ejected far enough under normal operating conditions. However, there may be situations when this is not the case. This may happen, for example, at very low operating temperatures or when the supply voltage is too low. In these cases it may happen that the cassette is not ejected far enough and therefore the cassette cannot readily be removed. This problem may be overcome by means of an additional switch. However, such a switch occupies additional space and requires additional electrical connections. Therefore, this step involves additional costs and is less suitable in the case of compact equipement.

SUMMARY OF THE INVENTION

It is the object of the invention to provide a magnetic-tape-cassette apparatus employing simple means to ensure that the cassette is always ejected far enough to be easily removed by hand.

According to the invention this object is achieved by a position-sensitive delay element which is movable by the control rod. The delay element is moved by its engagement with a guide means on the control rods into a position to delay the stopping instant, during the ejection movement of the cassette. In the delay position the delay element takes over the co-operation of the switching projection with the switching arm of the switch, which then remains in the activated position. Towards the end of the ejection movement the delay element is released from its delay position by the control rod in such a way that it can be moved to the de-activated position by the switching arm of the switch, in which de-activated position the switch stops the motor drive.

The use of this delay element provides such a delay time and delay path that the cassette is always ejected far enough. This results in a certain hysteresis which ensures that the motor starting point after insertion of the cassette does not correspond to the switching-off point during ejection. The switching-off point of the motor during ejection is shifted so far that the motor cannot be switched off until the cassette has passed the starting point. Preferably, the delay element is manufactured by means of an injection-molding technique, so that it can be very cheap.

In accordance with a preferred embodiment of the invention the delay element is positioned by a guide means which co-operates with a follower arm of the delay element during the ejection movement. This means guides the follower arm at the end of the ejection movement in such a way that the follower arm is moved out of the delay position into a release position in which the switching arm of the switch is released by the delay element. The guide means on the control rod enables the delay element to be controlled in a simple way, the movement of the control rod being an unambiguous indication of the length of the ejection path. The guide means is preferably formed on the control rod during molding, so that it can be manufactured accurately at low cost.

In this embodiment of the invention, the guide means preferably comprises a guide wall which moves along the follower arm during the ejection movement. The wall has a re-entrant portion which passes the follower arm at the end of the ejection movement, so that this arm engages said re-entrant portion, causing the positioning to be discontinued. When a new loading movement begins the follower arm is returned to the guide wall along a re-entrant guide path, from which guide wall the follower arm resumes the positioning movement into the delay position. The guide wall, the re-entrant portion and the guide track form a closed path which is necessarily followed. After every ejection the follower arm is always returned to its initial position from which it runs onto the guide wall upon insertion.

In accordance with another embodiment of the invention the follower arm is connected to a sleeve by a plastics integral hinge. The sleeve carries a positioning projection which co-operates with the switching arm of the switch. The sleeve is rotatable about a pivot of the lever which carries the switching projection. By mounting the sleeve onto the spindle of the lever the delay element occupies practically no additional space and no additional spindle for the sleeve is needed.

In accordance with still another embodiment of the invention the sleeve carries a stop projection which co-operates with a stop on the deck plate in such a way that when it engages the re-entrant portion in the guide wall the follower arm can only enter the guide path up to the run-in area. In yet another embodiment of the invention the switching arm can be urged against the delay element by means of a spring and the follower arm can thus be pressed into the re-entrant portion when positioning ceases. Therefore, no additional spring is required for the movement of the delay element. For this purpose use is made of the spring inside the switch, which spring urges the switching arm into its off-position.

In a further embodiment of the invention the switching projection retains the switching arm in the activated position from the beginning of the loading movement until take-over by the positioning projection. During the ejection movement the positioning projection is moved into a position in which it is in register with the switching projection and in which the switching arm abuts against both projections. This coincident position ensures that the switching arm actuates the positioning projection when the switching projection moves away with the transport lever.

In yet a further embodiment of the invention the transport lever can be pivoted into the ejection position by means of a pin on the control rod, causing the switching projection to move away from the switching arm, and the positioning projection is in the position in which it is positioned against the switching arm by means of the guide wall until the follower arm engages the re-entrant portion a certain time after the switching projection has pivoted away, so that the switching arm pushes the delay element away to stop the motor drive under the influence of the spring force exerted by said switching arm. When the pin and the re-entrant portion are positioned correctly relative to one another, this ensures that the cassette is always ejected far enough.

An embodiment of the invention will be described in more detail, by way of example, with reference to the accompanying drawings.

DESCRIPTION OF THE PREFERRED EMBODIMENT

The Tape Drive Mechanism

Figure 1:
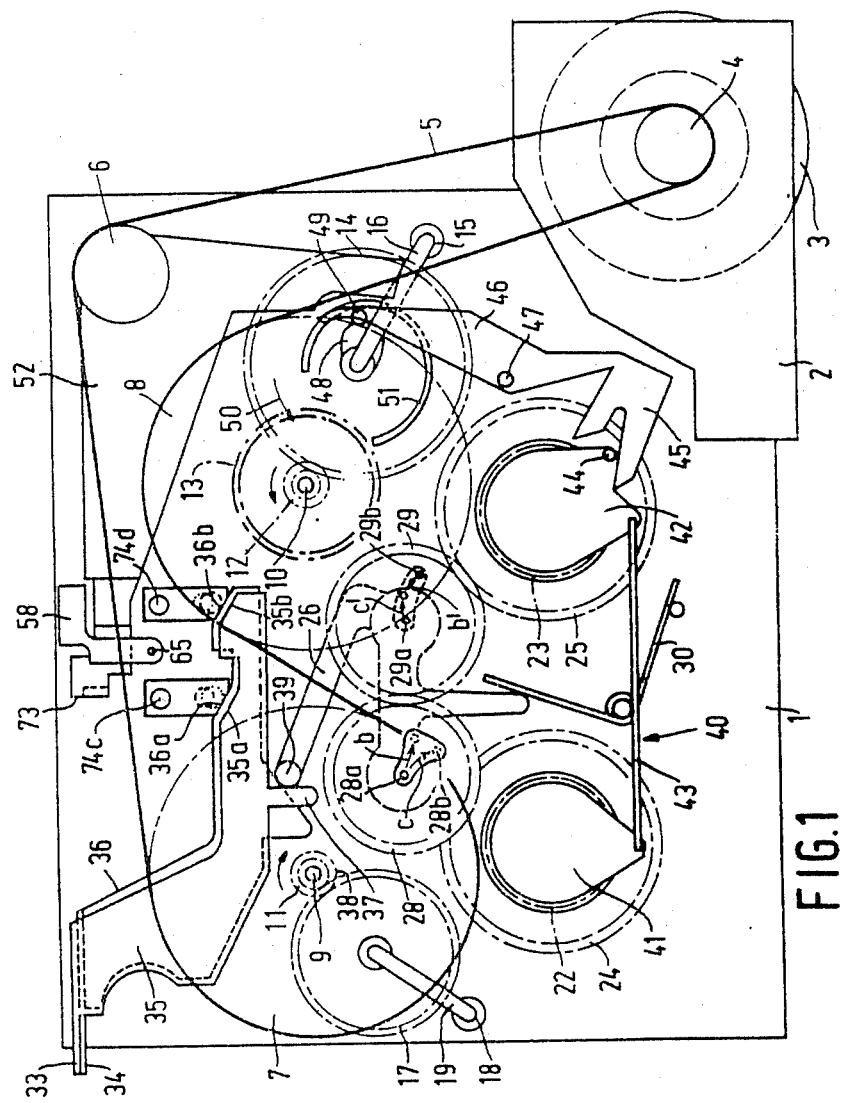
FIG. 1 illustrates a part of a magnetic-tape-cassette apparatus with which the invention may be used.

The magnetic-tape-cassette apparatus in accordance with the invention, as shown in FIG. 1, comprises a deck plate 1 which carries a non-reversible drive motor 3 guides a belt 5, which is passed along flywheels 7 and 8 via a guide roller 6 in such a way that the flywheels rotate in opposite directions. The flywheels 7 and 8 are rotatable journalled in the deck plate 1. The flywheel 7 is rigidly connected to a capstan 10. Moreover, the flywheel 7 is connected to a capstan 10. Moreover, the flywheel 7 is connected to a gear wheel 11 and the flywheel 8 is connected to a gear wheel 12. Via a slipping clutch a further gear wheel 13, which is coaxial with the gear wheel 12, is rotatably relative to the flywheel 8. A switching wheel 14 in the form of a gear wheel is constantly in mesh with the gear wheel 12 on the flywheel 8. This gear wheel 14 is arranged to be pivotable about a spindle 15. The spindle 15 carries a pivotal arm 16, shown schematically in FIG. 1, on which the switching wheel 14 is mounted for rotation. In a similar way a gear wheel 17 is constantly in mesh with the gear wheel 11. This gear wheel 17 is arranged to be pivotable about a spindle 18 by means of a pivotal arm 19, which is shown schematically.

Figure 3:
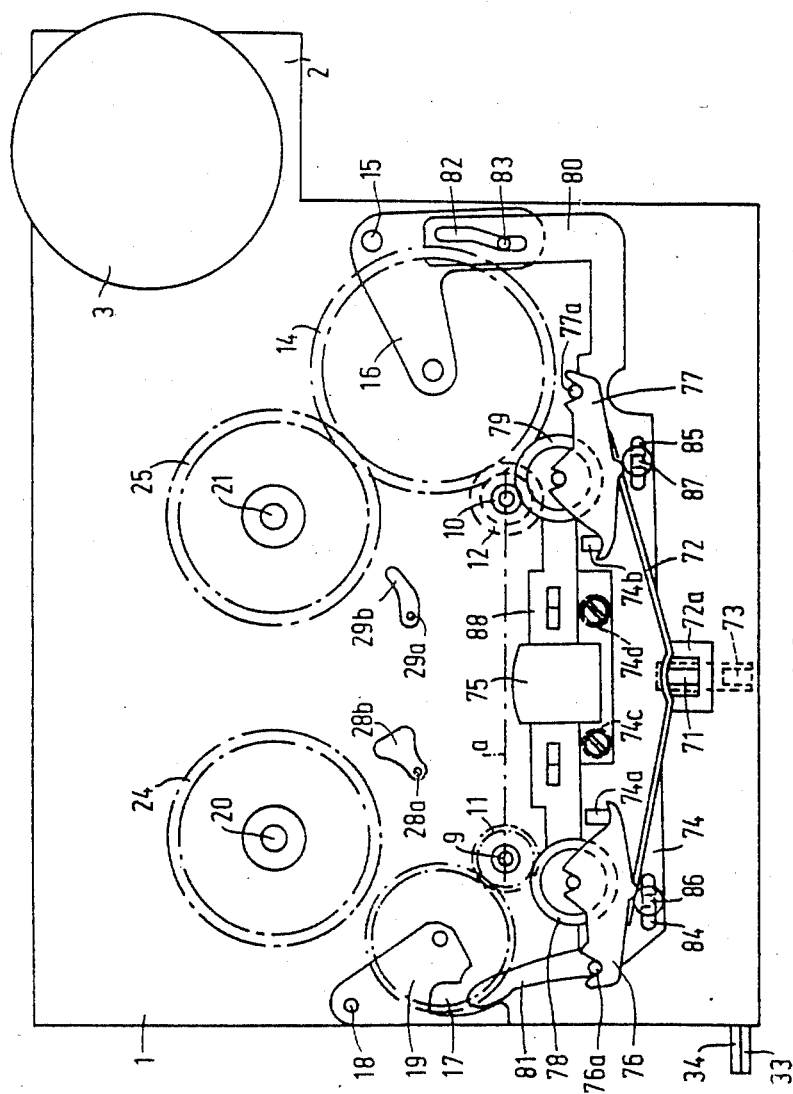
FIG. 3 shows a part of the apparatus of FIG. 1, viewed from the magnetic-head side, in a first direction of tape transport.
Figure 4:
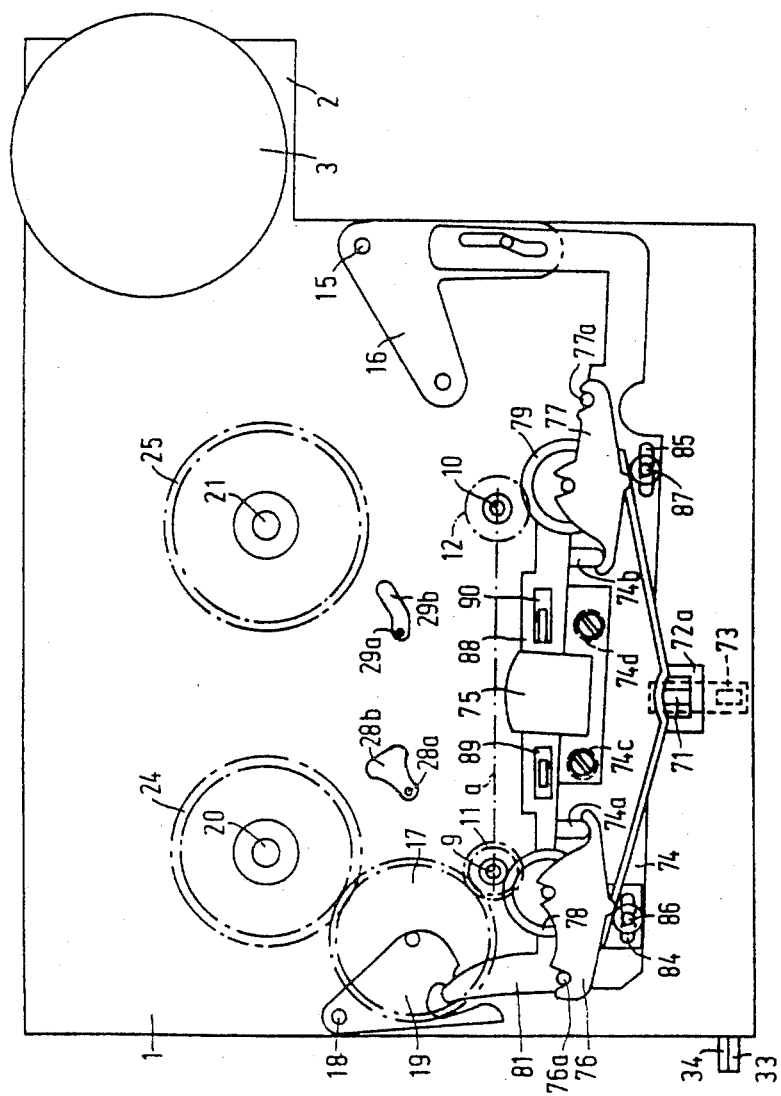
FIG. 4 shows some part of the apparatus of FIG. 1, viewed from the magnetic-head side, in a direction of tape transport opposite to that in FIG. 3.

As is also shown in FIGS. 3 and 4, winding spindles 20 and 21 are rotatably journalled in the deck plate 1. These winding spindles 20 and 21 are rigidly connected to a fast-wind wheels 22, 23, Via slipping clutches play wheels 24, 25 are coupled to the winding spindles 20, 21.

FIG. 3 shows how the play wheel 25 is driven by the gear wheel 12 via the switching wheel 14. In a similar way FIG. 4 shows how the play wheel 24 is driven by the gear wheel 11 via the gear wheel 17.

A member 26, which is movably guided in the deck plate 1, carries two gear wheels 28, 29 (see FIG. 1) adjacent each other. A spring 30 urges the member 26 towards its initial position shown in FIG. 1.

The member 26 carries pins 28a and 29a, which are mobably guided in a triangular hole 28b and a slot 29b, respectively, in the deck plate 1.

For fast forward and reverse winding there are provided two adjacent longitudinally movable actuating rods 33 and 34 which are connected to slides 35, 36. These slides 35 and 36 cooperate with the member 26. For this purpose the slide 35 is formed with a projection 37 and the slide 36 is formed with a guide surface 38. The projection 37 and the guide surface 38 cooperate with a pin 39 on the member 26. The slides 35, 36 further comprise guide surfaces 35a, 35b and 36a, 36b, respectively, which can cooperate with pins 74c, 74d of a head-mounting plate 74 (see also FIGS. 3, 4).

When as a result of the depression of the actuating rod 33 the projection 37 is urged against the pin 39 on the member 26, the gear wheel 29 first comes into mesh with the gear wheel 13. The pin 28a then moves in the direction indicated by the arrow b and the pin 29a in the direction 29a moves further in the direction indicated by the arrow b', as a result of which the gear wheel 29 also meshes with the gear wheel 23. The magnetic tape is now wound rapidly by the winding spindle 21. If the other actuating rod 34 is depressed, the guide surface 38 cooperates with the pin 39 on the member 26. The pin 28a then moves in the directions indicated by the arrow c and the pin 29a in the direction indicated by the arrow c', so that the gear wheel 28 meshes with the gear wheel 22. In this way the other winding spindle 20 is driven for fast winding.

When the head-mounting plate 74 has reached a playing position, the pins 74c, 74d assume one of the broken-line positions shown in FIG. 1. The positions correspond to the positions shown in FIG. 3 and 4, respectively. Depression of the actuating rods 33 and 34 has for its result that via the guide surfaces 35a, 35b and 36a, 36b respectively, the pins 74c, 74d and hence the head-mounting plate 74, are moved to the left so that a sound head 75 and pressure rollers 78, 79 are lifted off the magnetic tape.

A detection means 40, comprising two discs 41, 42 and a connecting rod 43, is connected to the winding spindles 20, 21 via slipping clutches. A pin 44 arranged on the disc 42 engages with a siwtching fork 45. The switching fork 45 is arranged on a switching member 46, which is pivotable about a pivot 47 (see also FIGS. 2A and 2B). The switching wheel 14 carries a central slightly elliptical projection 48. The switching member 46 extends over the switching wheel 14 and carries a pin 49 which, when the switching member 46 has pivoted inwards, can travel around the projection 48 if the switching wheel is rotated in the direction indicated by an arrow 50. Around the projection 48 a spiral guide wall 51 is formed on the switching wheel 14 at a comparatively large distance. This guide wall 51 can also co-operated with the pin 49 on the switching member 46, namely when the detection means detects tape stoppage. The pin 44 is then no longer pressed against the switching fork 45, so that the pin 49 on the switching member 46 is no longer urged inwards towards the projection 48 but remains in the same position and, as the switching wheel 14 continues to rotate in the direction indicated by the arrow 50, reaches the outer side of the guide wall 51. Since the guide wall 51 is spiral-shaped the switching member 46 will be pivoted clockwise (arrow 46a in FIGS. 2A, 2B) about its pivot 47, so that the switching member 46 is urged against a connecting member 52.

Figure 2A:
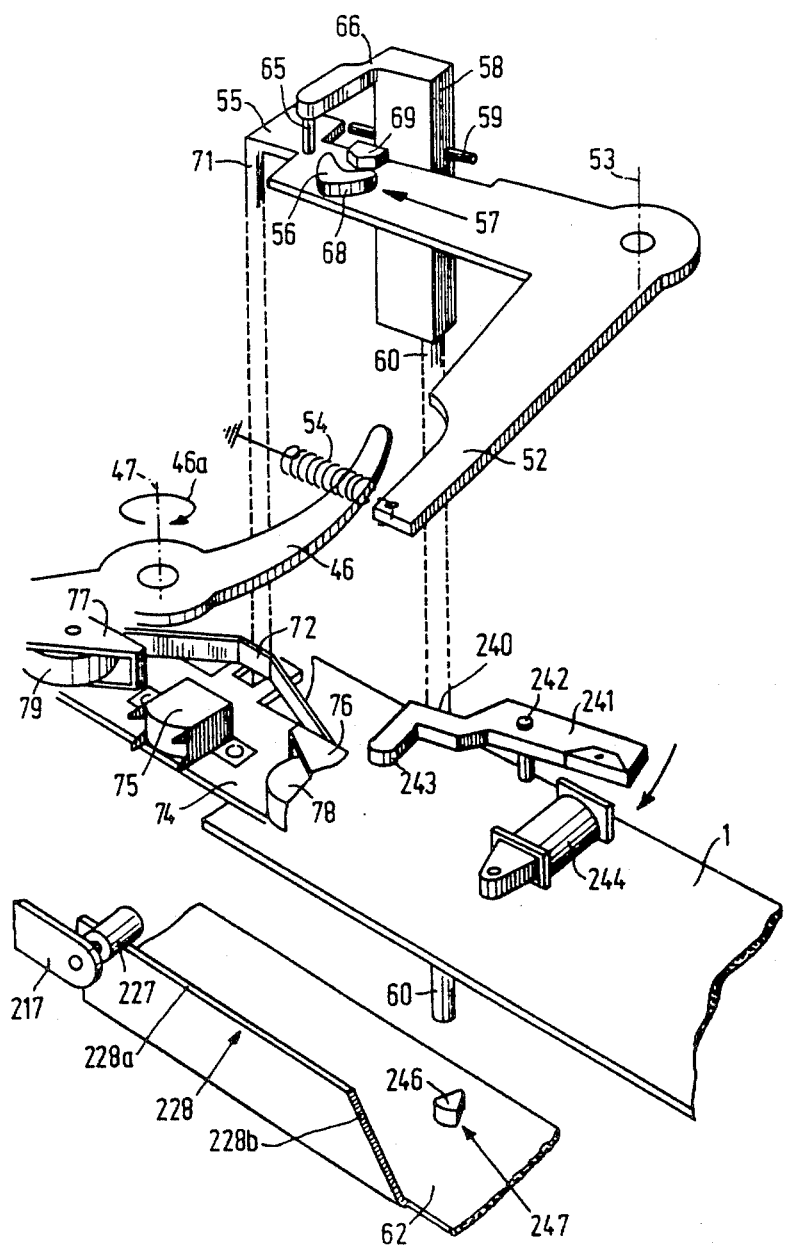
FIG. 2A shows a latching mechanism of the apparatus of FIG. 1 on an enlarged scale in a first position.
Figure 2B:
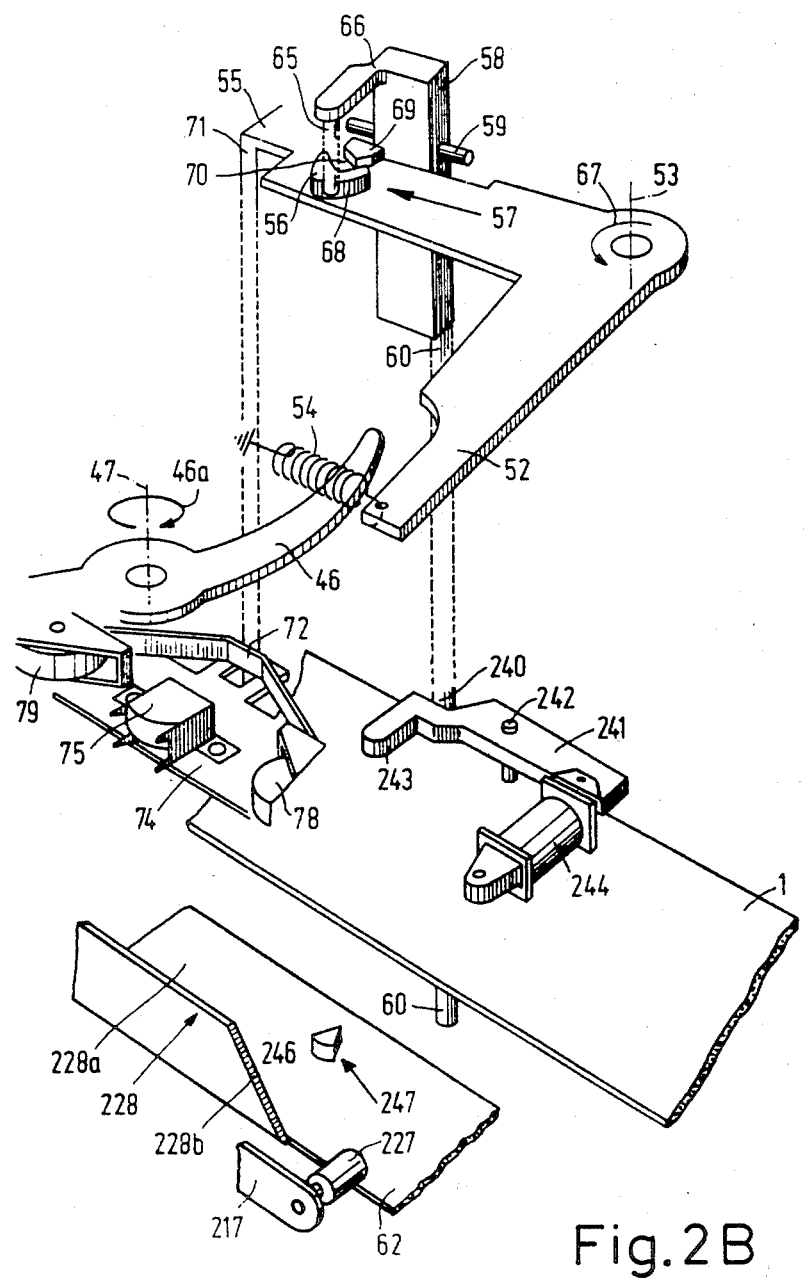
FIG. 2B shows the latching mechanism of FIG. 2A in a second position.

The connecting member 52 is a lever having two arms, which lever is pivotable about a pivot 53. As can be seen in FIGS. 2A and 2B, the connecting member 52 is spring-biased in the clockwise direction by a spring 54. Thus, the movement of the switching member 46 tensions the spring 54.

The lever arm 55 of the connecting member 52, which arm is remote from the point of engagement with the switching member 46, carries a heart-shaped projection 56, which forms part of a latching mechnism 57. The latching mechanism 57 also comprises a latching lever 58, which can be pivoted about a spindle 59. The spindle 59 extends parallel to the upper surface of the deck plate 1 and to an imaginary connecting line a between the capstans 9 and 10. At its side which faces the heart-shaped projection 56 the latching lever 58 carries a guide pin 60 which extends through a hole 61 in the chassis 101. The movement of the latching lever about the spindle 59 will be described hereinafter with reference to FIG. 8.

The latching lever 58 carries a latching pin 65, which can engage with and pass around the heart-shaped projection 56. This is achieved by means of, for example, an integral hinge 66. In FIG. 2A the pin 65 is disposed above the heart-shaped projection 56. In FIG. 2B the pin 65 is positioned in the area where it can engage with the heart-shaped projection 56. The pin 65 can cooperate with the heart-shaped projection 56 is the switching member 46 pivots the connecting member 52 in the anti-clockwise direction indicated by an arrow 67, as shown in FIG. 2B. During this pivotal movement the pin 65 has moved along a side wall 68 of the heart-shaped projection 56. A guide 69 ensures that the pin 65 engages in a recess 70 in the heart-shaped projection 56.

The lever arm 55 carries a limb 71. As can be seen in FIGS. 3 and 4, this limb 71 cooperates with a blade spring 72 and extends through a slot 73 in the deck plate 1. With its free ends the blade spring 72 acts against members 76 and 77 which are pivotally journalled on the head-mounting plate 74. In its centre this head-mounting plate 74 carries a sound head 75 and on each side of the sound head 75 one of the members 76, 77 in which the pressure rollers 78, 79 are journalled. The members are urged against stops 74a and 74b on the head-mounting plate 74.

The head-mounting plate 74 has angular end-portions 80, 81. The end portion 80 is formed with a slot 82, in which a pin 83 is movable, which pin is mounted on the pivotal arm 16. Thus, in the position shown in FIG. 3, the pivotal arm 16 has pivoted about the spindle 15 in such a manner that the switching wheel 14 is in mesh with the play wheel 25 and the gear wheel 12. In a similar way FIG. 4 shows that the end portion 81 of the head-mounting plate 74 has pivoted the pivotal arm 19 about the spindle 18, so that the gear wheel 17 is in mesh with the play wheel 24 and the gear wheel 11. Moreover, in the position shown in FIG. 3 the pressure roller 79 is urged against the capstan 10 and in the position shown in FIG. 4 the pressure roller 78 is urged against the capstan 9.

The head-mounting plate 74 has slots 84, 85 which extend parallel to the connecting line a between the capstans 9, 10 and guide-pins 86, 87 are movable in these slots.

Figure 5:
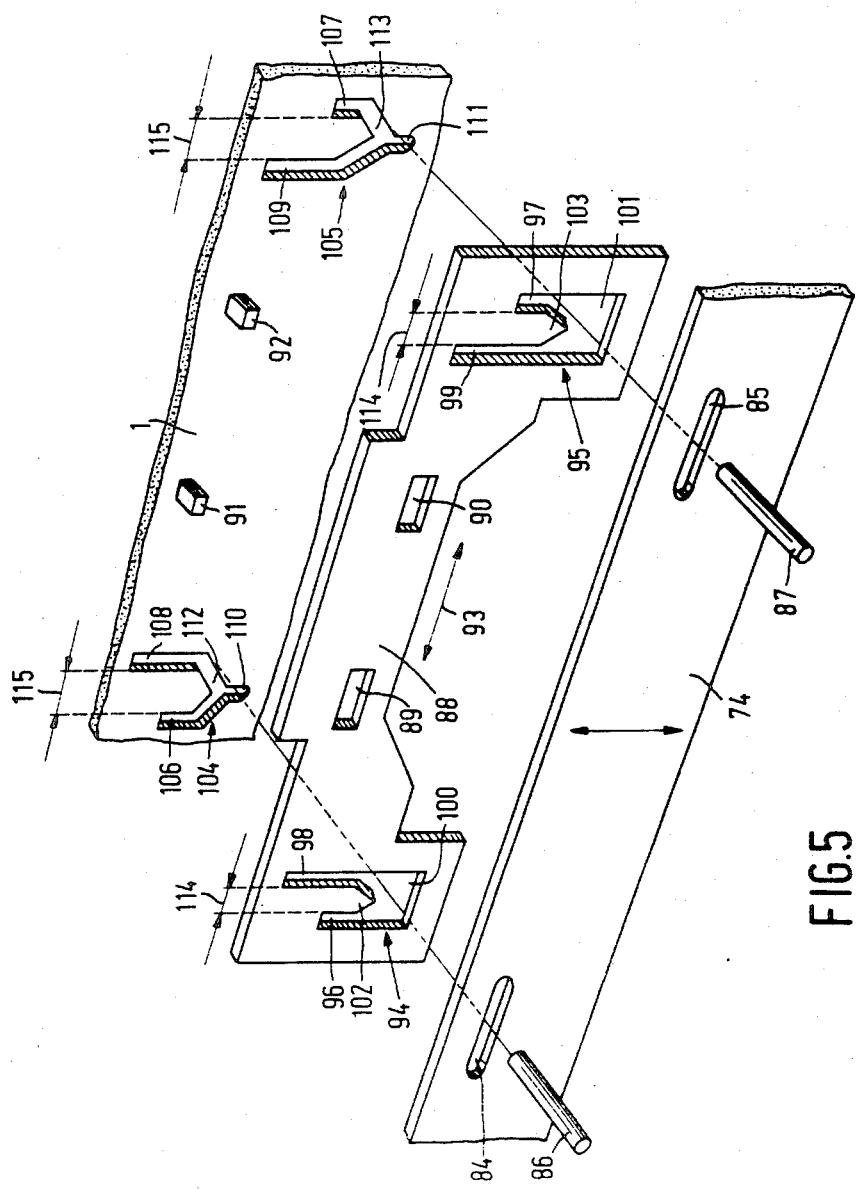
FIG. 5 is an exploded view illustrating how a guide-slot system of the apparatus of FIG. 1 co-operates with control means for changing over the tape-transport direction and the head-mounting plate.

The exploded view in FIG. 5 shows the guide pins 86, 87 which are guided in the slots 84, 85 in the head-mounting plate 74. Thus, the guide pins can be moved parallel to the connecting line a between the capstans. How the guides 86, 87 are retained in the head-mounting plate 74 is not shown. A simple construction is to secure the guide pins to a cap in the same way as the pin of a thumb-tack. However, alternatively, the guide pins may be arranged on the free ends of resilient tongues which are secured to the head-mouting plate 74.

A control plate 88, which serves as the control means, is arranged between the head-mounting plate 74 and the deck plate 1. This control plate 88 is formed with longitudinal slots 89, 90 through which projecting guides 91, 92 on the deck plate extend. As a result of this, the control plate 88 is movable parallel to the imaginary connecting line a between the capstans 9, 10. In FIG. 5 this movement possibility is indicated by a double arrow 93.

On both ends the control plate 88 is formed with U-shaped slots 94, 95. The U-shaped slots 94 and 95 each have a short branch 96, 97 and a long branch 98, 99. The short branches are remote from each other and the long branches are disposed closer to each other. The connecting portions 100 and 101 between the short and the long branches are substantially wider. Between the long and short branches tongues 102 and 103 are formed, which tongues have pointed ends which face the cnnecting portions 100, 101.

Fork-shaped guide slots 104 and 105, which constitute a guide-slot system, are formed in the deck plate 1, which slots each comprise two branches corresponding to the fork tines, one branch 106, 107 being shorter than the other branch 108, 109. A central run-in branch 110, 111 opens into the trough-shaped fork base 112, 113. The distance 114 between the branches of the U-shaped guide slots 94, 95 in the control plate 88 is smaller than the distance 115 between the lateral branches of the fork-shaped guide slots 104, 105.

Figure 7:
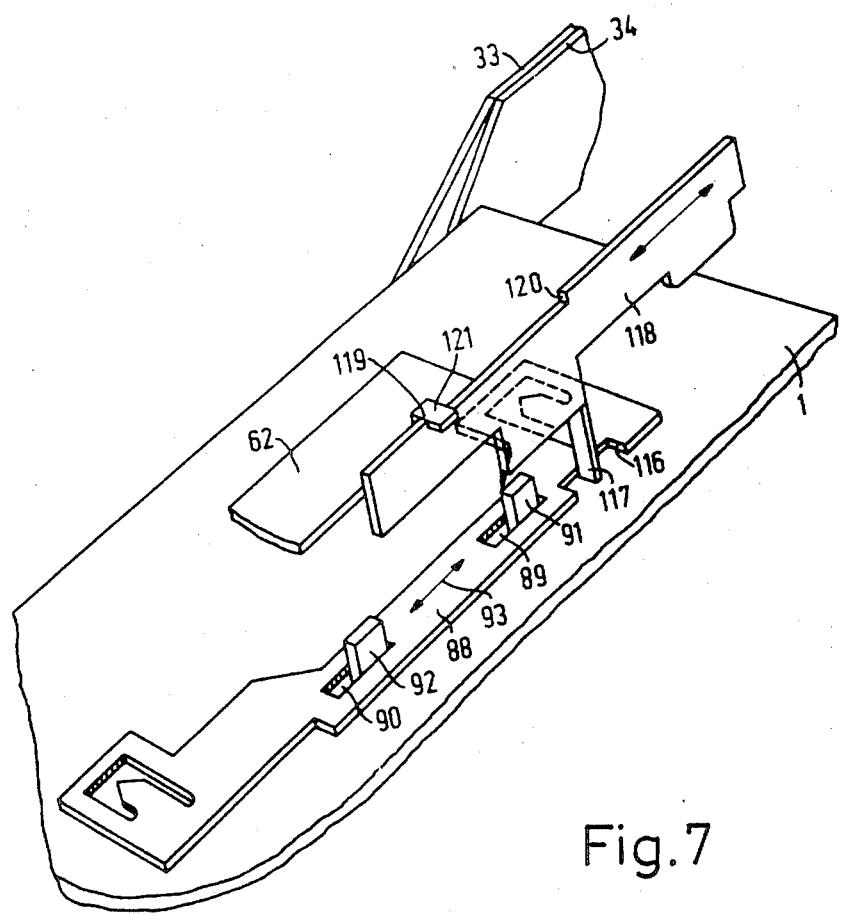
FIG. 7 illustrates a part of a device for obtaining a preferred direction of tape transport.

FIG. 7 is a perspective view showing the deck plate 1 with the control plate 88. The control plate 88 is provided with a stop 116 with which a projection 117 of an intermediate slide 118 can abut, which slide can be moved parallel to the imaginary connecting line a between the capstans 9 and 10 (FIGS. 4 and 5). The intermediate slide 118 is provided with two stops 119 and 120 which can co-operate with an actuating portion 121 of a control rod 62 to be described with reference to FIG. 8. If the rod 62 is moved to the right to eject a cassette, the intermediate slide 118 is moved to the right and the actuating portion 121 abuts against the stop 120.

As a result of this, the projection 117 abuts against the stop 116. In this way the control plate 88 is shifted to the right in the direction indicated by the double arrow in FIG. 7 and occupies a preferred position as shown in FIG. 6C. However, if the rod 62 is moved to the left, the actuating portion 121 abuts against the stop 119. The projection 117 is then withdrawn from the stop 116 and the control plate 88 can move freely to perform the cycle of movements described in the foregoing.

The Servo and Insertion/Ejection Mechanism

Figure 8:
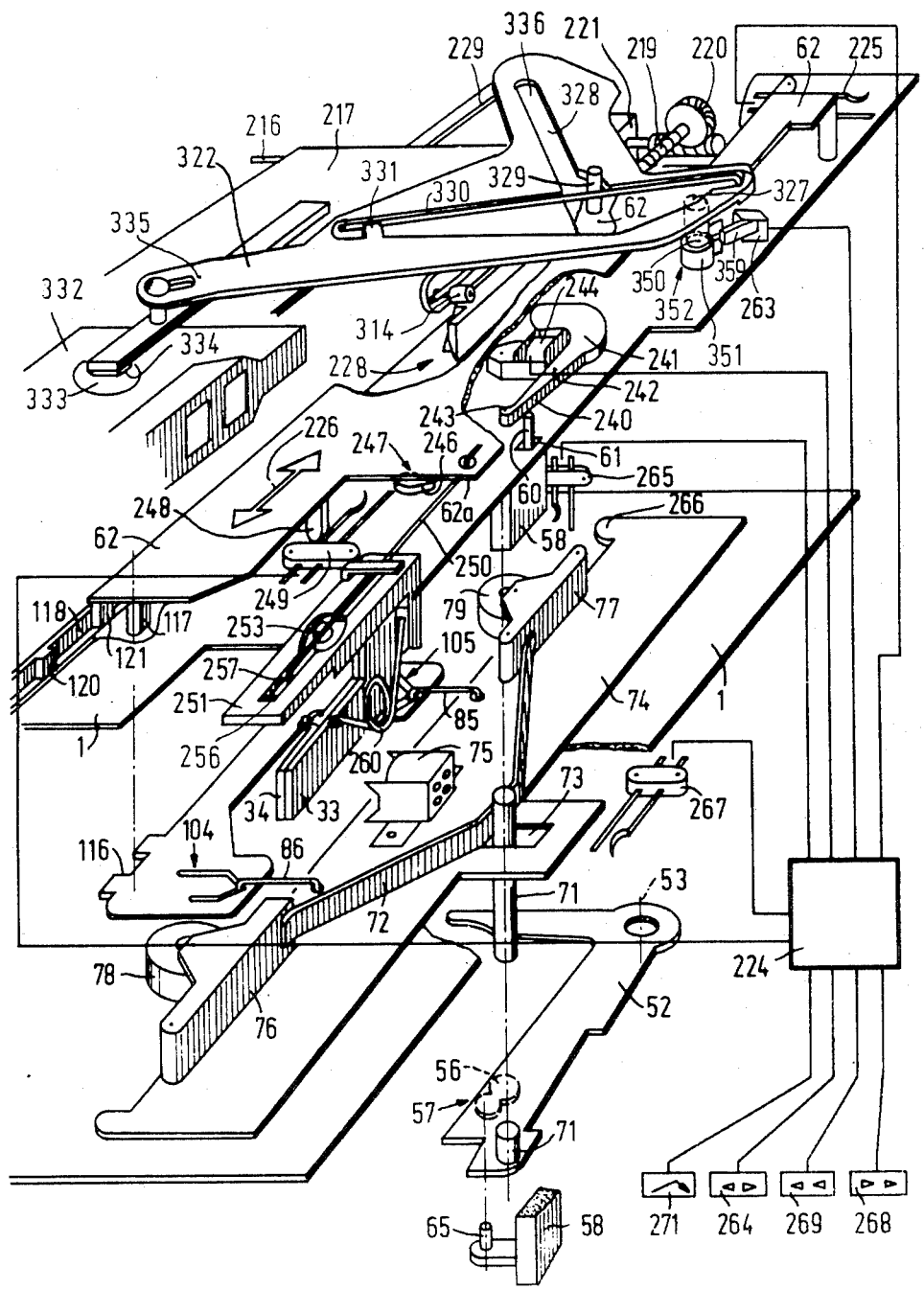
FIG. 8 is a diagrammatic exploded view of a servo and insertion/ejection mechanism in accordance with the invention.

The servo mechansim shown in FIG. 8 comprises a control rod 62, which is movable in the deck plate adjacent a cassette lift 217 in the longitudinal direction 226. The longitudinal direction is the loading and ejection direction of a cassette 332. The servo rod 62 is moved by means of a threaded spindle 219. This threaded spindle is driven, through a worm gear 220, by a reversible servo motor 221, which is controlled by a control circuit 224 of the microprocessor type. A switch 225 on the deck plate 1 limits the travel of the rod 62 in one direction. The switch 225 marks the end position of the rod 62 in the direction of a double arrow 226 for the switching device 224, to which position all servo-rod movements are referred.

The lift 217 is pivotable about a spindle 216 and its vertical movement is guided by means of a roller 314 which cooperates with a double guide member 228 of the rod 62.

In FIG. 8 the double guide member 228 and the roller 314 are shown only schematically. A transport lever 322 is pivotable about a pivot in the form of a spindle 327. The lever 322 has a guide slot 328 in which the pin 329 of the rod 62 engages. The pin 329 can move in the slot 328 and thereby pivot the lever 322. A wire spring 330 extends transversely of the slot 328 and is fastened at its ends 331.

Figure 9:
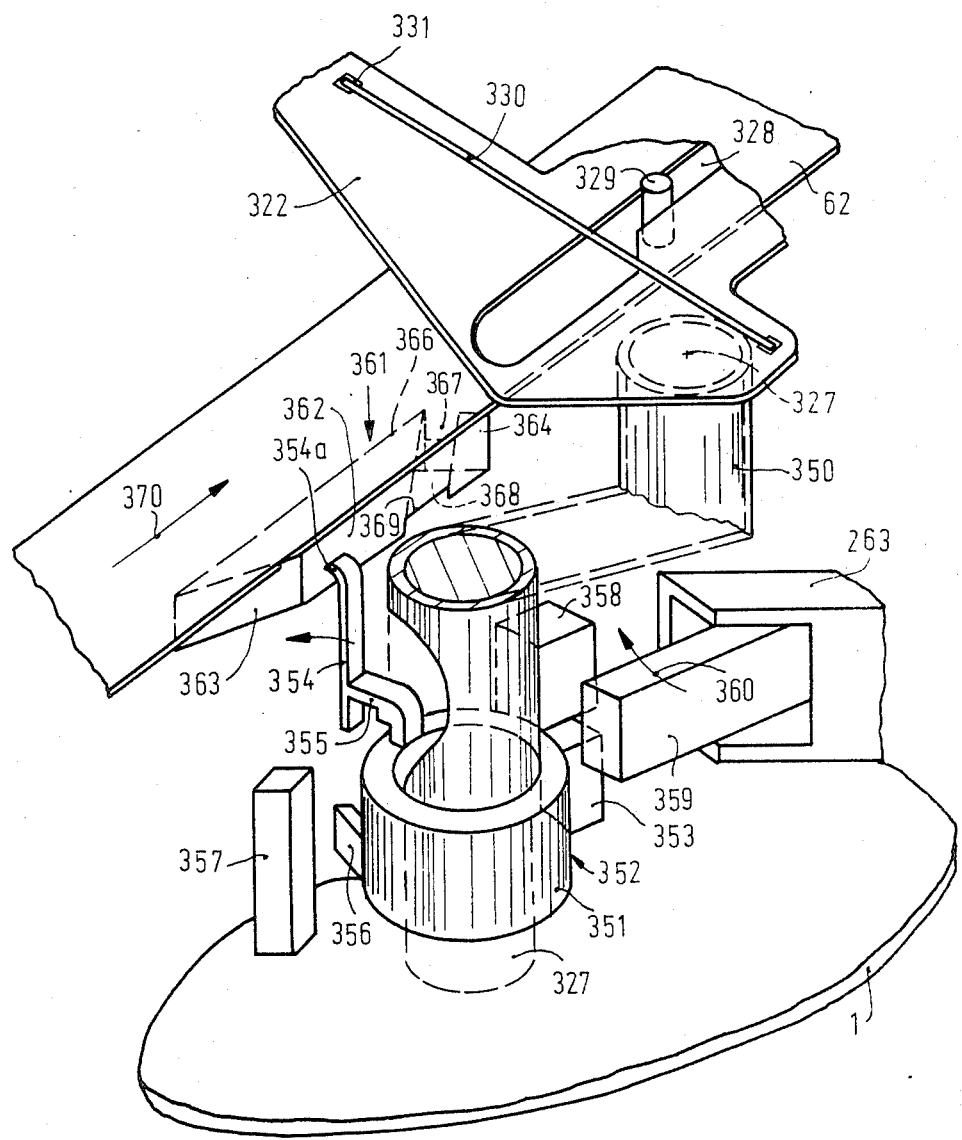
FIG. 9 illustrates a starting and stopping mechanism in the apparatus shown in FIG. 1, FIGS. 10 to 12 schematically show three different positions of the starting and stopping mechanism shown in FIG. 9.

As is shown in FIG. 9 a hollow spindle 350 which is coaxial with the pivot 327, is rigidly connected to the transport lever 322 and enables the transport lever 322 to be pivoted about the pivot 327. A sleeve 351 is pivotally mounted on the hollow spindle 350. The sleeve 351 forms part of a delay element 352. The sleeve 351 carries a positioning projection 353, a follower arm 354 connected to the sleeve 351 via an integral hinge 355, and a stop projection 356. The hinge 355 permits pivoting of the arm 354 about an axis which is transverse to the pivoting axis of the spindle 350 and sleeve 351. The stop projection 356 co-operates with a stop 357 on the deck plate 1.

The spindle 350 carries a switching projection 358 which is in register with the positioning projection 353 in the position shown in FIG. 9. Both projections are situated opposite a switching arm 359 of the switch 263. By means of a spring, not shown, the switching arm can be urged towards the projections 353 and 358 in the direction indicated by an arrow 360.

The control rod 62 carries a guide means 361. This guide means is situated substantially underneath the control rod 62 and is molded on this rod. At the side of the follower arm 354 the guide means 361 comprises a guide wall 362. This guide wall 362 co-operates with the free end 354a of the follower arm 354. Underneath the control rod 62 the guide wall 362 adjoins an inclined run-on surface 363. The side of the guide wall 362 facing the transition between the surface 363 and the wall 362 is formed with a rentrant portion 364 in the form of a receding surface. A run-in area 367 for the follower arm 354 is situated between the guide wall 362 and a facing wall 366. The run-in area 367 adjoins an inclined guide path 368 which terminates at the guide wall 362 at the location of a cut-out portion 369.

By means of the cassette lift 217 a cassette 332 can be moved inwards. The cassette 332 has a winding-spindle hole 333, which is engaged by an element 334 mounted for rotation on an arm 335 of the lever 322.

The pin 60 of the latching lever 58 extends through the hole 61 in the deck plate 1 and abuts against an edge 240 of the latching lever 241. The latching lever 241 is pivotable about a pivot 242. By means of the connecting member with the spring 54 the lever 58 tends to pivot the latching lever 241 away from a latching magnet 244. A nose 243 on the lever 241 can co-operate with a guide surface 246 on the rod 62. The latching magnet 244 is electrically connected to the control circuit 224.

The guide surface 246 forms part of a nose 247 which is molded on the rod 62. When the servo rod 62 is moved, the guide surface 246 on the nose 243 can co-operate with the lever 241 and thereby move this lever in such a way that it is applied to the latching magnet 244. An adjustable projection 248 simultaneously co-operates with a play and reverse swtich 249. As the projection 248 moves along the switch 249 this normally closed switch is briefly opened and is then closed again.

Near an end 62a of the rod 62, this rod is connected to a command element in the form of a connecting rod 250. The connecting rod is bent and hooked into a hole in the rod 62. The connecting rod 250 extends up to a command block 251. A bent end portion of the connecting rod 250 forms a command pin 257 which is movable in guide paths in this command block.

Operation - Insertion

The control device operates as follows. In the position shown in FIG. 8 the element 334 has engaged the winding-spindle hole 333 in the manually inserted cassette. In this position the cassette 332 still projects approximately 30 mm from the apparatus. When the cassette 332 is pushed further inwards the spring 330 is tensioned as a result of clockwise pivoting if the lever 322, and the switching projection 358 pivots the switching arm 359 into a starting position in a direction opposite to that indicated by the arrow 360. These movements close the switch 263. When the switch 263 is closed the microprocessor 224 is electrically connected, and the control rod 62 is then moved inwards by the drive motor 221 in the direction indicated by the arrow 370 in FIG. 8 and moves further to the right up to the reset switch 225. The pin 329 now moves within the guide slot 328 towards the end of this slot and thus releases the spring 330. The spring 330 can now relax and the lever 322 is no longer loaded by the tension spring. Consequently, no lateral force is exerted on the spindle 327.

Normal and Fast Winding

Closure of the reset switch 225 results in the microprocessor 224 being reset to an initial state. The direction of rotation of the servo motor 221 is then reversed and the servo rod 62 is moved to the left. The projection 248 then moves along the play/reverse switch 249, which is opened and switches off the servo motor, so that the servo rod stops. The tape-deck motor 3 is now started. The guide surface 246 has abutted against the nose 243, but the latching lever 241 is not applied to the latching magnet 244 because this magnet is not energized by the circuit 224. Therefore, the pin 65 has not engaged the latching mechanism 57 and is not latched.

Since the motor 3 has started, the flywheels 7 and 8 rotate in opposite directions. At the same time the gear wheels 11 and 12 and the gear wheels 14 and 15, with which they are in mesh, are rotated. The latching lever 58 is moved from the position shown in FIG. 2A to the position shown in FIG. 2B and the latching pin 65 is in a position in which it can co-operate with the heart-shaped projection 56 as shown in FIG. 2B.

As the gear wheels 14 and 17 are not in mesh with the gear wheels 24 and 25, the two winding spindles 20 and 21 are not driven. The discs 41 and 42 are coupled to the winding spindles 20, 21 via separate friction clutches and are therefore also stationary. Since no torque is exerted on the switching member 46 when the cassette is inserted, because the reels do not rotate and there is no tape transport, the switching member 46 remains in the position shown in FIG. 1 and the pin 49 is moved against the outer side of the guide wall 41. As a result of this, the switching member 46 is moved in a clockwise direction, as indicated by the arrow 46a (FIG. 2A) and the connecting member 52 is pivoted anticlockwise (arrow 67). Since the latching lever 58 is pivoted and the pin 65 is positioned in the area of engagement with the heart-shaped projection 56, the pin 65 now travels along the wall 68 of the heart-shaped projection 56 and engages the recess 70. Thus, the connecting member is latched in a pivoted position (see FIG. 2B).

As a result of the pivotal movement of the connecting member 52 in the counterclockwise direction indicated by the arrow 67, the limb 71 has moved inwards and is urged against the blade spring 72. The blade spring in its turn presses against the head-mounting plate 74, via the members 76 and 77 and tends to urge this plate towards to the capstans 9, 10. Now the action of the control plate 88 manifests itself.

Prior to the pivotal movement of the limb 71 the head-mounting plate 74 has moved away from the capstans. As a result of this, the guide pins 86, 87 have engaged the run-in branches 110 and 111 (see FIG. 5). The control plate 88 has already assumed the position shown in FIG. 6c, after ejection of the last cassette, as described with reference to FIG. 7. When the head-mounting plate 74 is moved towards the capstans 9, 10 the guide pins 86, 87 move forwards and abut against the right-hand sides of the tongues 102, 103 to run into the right-hand branches 107 and 108 of the fork-shaped guide slots 104, 105. When the guide pins 86, 87 enter the branches 107 and 108, these pins move the control plate 88 to the right, so that the branches 98, 108 and 97, 107 coincide. The right-hand guide pin 87 is then retained in the shorter branch and the left-hand guide pin 86 can move freely towards the capstan 9 (see FIG. 6D). As a result of this, the advanced head-mounting plate 74 swings forward to the left, in such a way that the left-hand pressure roller 78 is applied to the left-hand capstan 9. The other capstan remains free. The head-mounting plate 74 very briefly occupies the position shown in FIG. 4.

As the pin 65 is not latched by the latching mechanism 57 the head-mounting plate is moved under the influence of the blade spring 72 and the spring 54 returns to its initial position. This causes a switch 267 to be changed over, so that the tape-deck motor 3 is switched off. This operation proceeds so fast that it is not noticed by the user. This is necessary because the movement of the control plate 88 as shown in FIG. 6D would result in the position for reverse play. However, upon insertion of a cassette the deck should first be set to forward play. By means of the microprocessor 224 this is achieved in that the servo motor 221 is started again and moves the rod 62 to the right up to the reset switch 225, after which it is again moved to the left until the latching lever 241 is drawn against the latching magnet 244. Since the magnet 244 is now energized, the lever 241 remains in this position, so that the pin 65 can be latched by the latching mechanism 57. The reverse play switch 249 is again opened by the projection 248, the rod 62 stops and the motor 3 is started again.

When the motor 3 is started again the control plate 88 is shifted. During the outward movement of the head-mounting plate 75 the guide pins 86, 87 have entered the run-in branches 110 and 111. The control plate remains in its previous position. Thus, the tongues 102 and 103 are then still in a position which is shifted to the right relative to the center position of the run-in branches 110 and 111 (FIG. 6A). When the motor 3 is started again the connecting member 52 is pivoted counterclockwise by the switching member 46, and the head-mounting plate 74 is thus moved forwards by means of the pin 71.

The control plate 88 is then in the position shown in FIG. 6A. When the head-mounting plate 74 is moved towards the capstans 9, 10 the guide pins 86, 87 move forwards, abut against the left-sides of the tongues 102, 103 and at the same time move into the left-hand branches 106 and 109 of the fork-shaped guide slots 104, 105. When the guide pins 86, 87 enter the branches 106 and 109 they move the control plate 88 to the left, so that the branches 96, 106 and 99, 109 coincide. The left-hand guide pin 86 is then retained in the shorter branch and the right-hand guide pin 87 can move freely towards the capstan 10 (FIG. 6B). The advanced head-mounting plate 74 then swings forward to the right, so that the right-hand pressure roller 79 is applied to the right-hand capstan 10. The other capstan remains free. The tape now runs in the forward play direction shown in FIG. 3.

When the end of the tape is reached the tape stops. As a result of this, the switching member 46 with the pin 49 is again pivoted in the clockwise direction. The connecting member 52 is again pivoted counterclockwise (FIG. 2B) in the direction indicated by the arrow 67. During this movement the connecting number 52 is pivoted beyond the normal travel obtained when it is in its latched position. This overtravel is possible because the limb 71 acts against the blade spring 72 on the head-mounting plate 74 via the members 76, 77 and thus has room for a movement towards the head-mounting plate. During this overtravel the pin 65 leaves the recess 70 and the latching mechanism 57 is released. Under the influence of the spring 54 the released connecting member 52 is now pivoted clockwise, so that the limb 71 moves outwards. In this position the head-mounting plate has returned to an outward position and the guide pins 86, 87 have again engaged the run-in branches 110 and 111. The control plate 88 remains in its last position. The tongues 102 and 103 thus remain in their previous positions which are shifted to the left relative to the center position of the runin branches 110 and 111 (FIG. 6C).

Now automatic reversal beings. The switching wheel 14 continues to rotate. Since the head-mounting plate 74 has moved backwards its bent end portion 80 has moved outwards and thereby moved the pivotal arm 16 in such a way that the switching wheel 14 is no longer in mesh with the play wheel 25. As a result, this wheel 25 is no longer driven. The detection means 40 then detect tape stoppage. Again the switching member 46 is pivoted clockwise. The switching member 46 presses against the connecting member 52 and pivots the latter counterclockwise in the direction indicated by the arrow 67. As a result of this, the pin 65 again cooperates with the heart-shaped projection 56 and finally engages the recess 70, thereby latching the connecting member 52. The limb 71 has now moved forwards again and the head-mounting plate 74 assumes the position shown in FIG. 4 after having moved forwards. Via the end portion 81 of the head-mounting plate 74 the gear wheel 17 comes into mesh with the gear wheel 11 and thus with the play wheel 24. In this position, as shown in FIG. 4, the pressure roller 78 is applied to the capstan 9 and the tape runs in the opposite direction.

Figure 6:
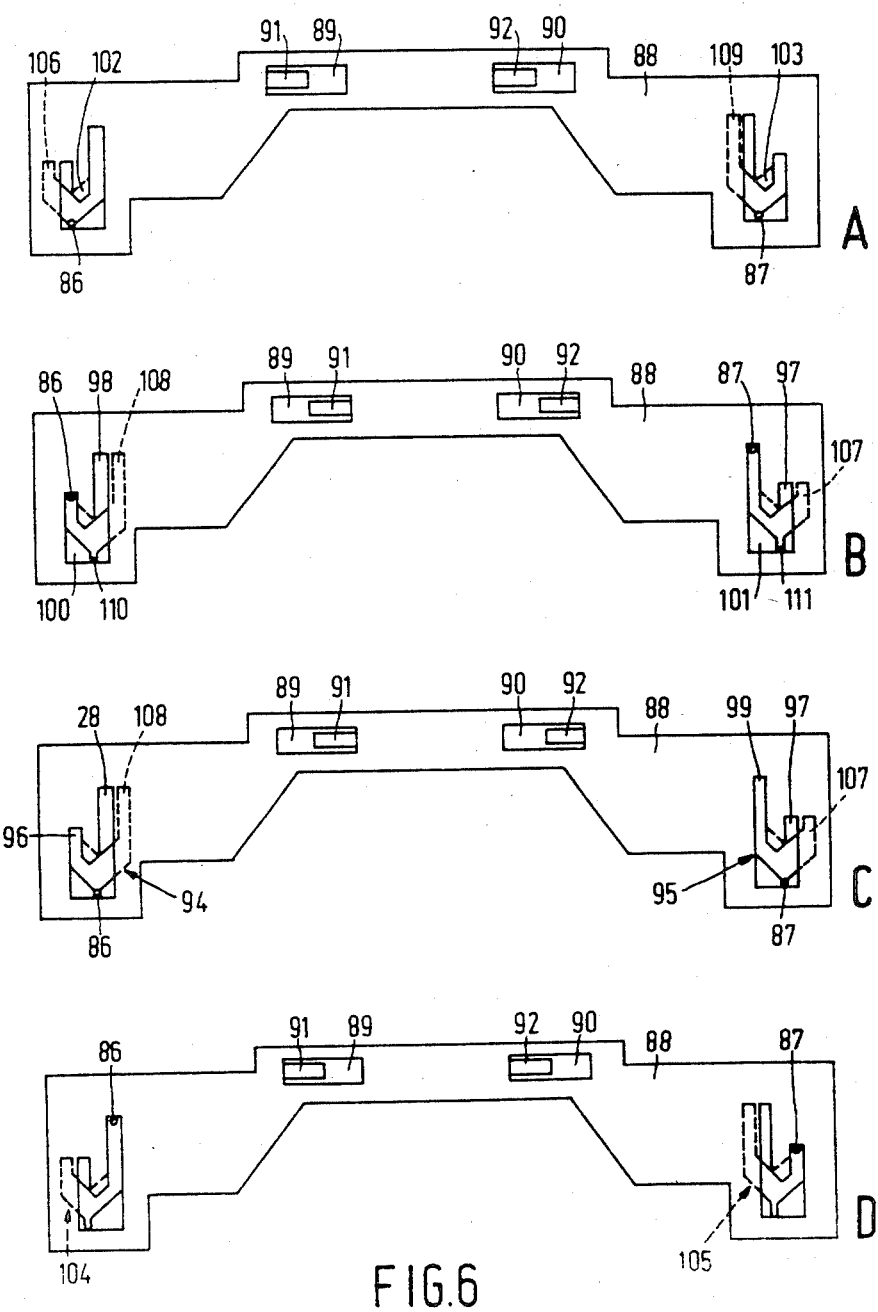
FIGS. 6A-D show different positions of a control plate and a control rod which co-operates with this plate to define a preferred direction of tape transport.

The reversal of the direction of tape transport is achieved by means of the system of guide slots which is shown in various positions in FIG. 6. The last position described is the position shown in FIG. 6C. In this position the control plate 88 has been moved to the left and the guide pins 86, 87 engage the run-in branches 110 and 111. Since the head-mounting plate 74 is moved forward again, the guide pins 86, 87 are also moved forward and abut against the right-hand oblique surfaces of the pointed tongues 102 and 103. Consequently, the guide pins 86, 87 are moved to the right and can move further into the branches 108 and 107. The transverse movement of the guide pins 86, 87 is possible owing to the sliding movement of the guide pins 86, 87 in the slots 84, 85. When the guide pins 86, 87 engage the branches 107 and 108, these pins have moved the control plate 88 so far to the right that the branches 108, 98 and 107, 97 coincide. As a result of this, the tongues 102, 103 are positioned so that when the guide pins again move backwards and forwards they can abut with the left-hand oblique surfaces of the tongues 102 and 103. This position of the system of guide slots is shown in FIG. 6D. The guide pin 87 is retained in the shorter branches 107 and 97, which prevents the head-mounting plate 74 from moving further to the right. On the left-hand side the guide pin 86 can move freely in the branches 108 and 98, so that on the left-hand side of the head-mounting plate 74 the spring 72 can urge the pressure roller 78 against the capstan 9. This position is shown in FIG. 4.

It is to be noted that there is provided a track switch 265 which supplies an indication about the direction of tape transport to the microprocessor 224. The track switch 265 is actuated by a nose 266 on the head-mounting plate 74 in the position shown in FIG. 3. In the other position of the head-mounting plate 74, as shown in FIG. 4, the switch is open. The switch 265 ensures that the magnetic head 75 is switched to the correct tracks depending on the direction of tape transport.

Reversing is readily possible by manual actuation in the normal play mode. For this purpose the locking magnet 244 is de-energized by briefly pressing a button 264 and the locking lever 41 is now released under the influence of the spring 54 on the connecting member 52. Thus, the pin 60 is tilted to the left in the situation shown in FIG. 8. The latching mechanism 57 is then released because the pin 65 is moved away from this mechanism. This enables the head-mounting plate 74 to be withdrawn. As a result of the change-over of the switch 67 the tape-deck motor 3 now stops until the servo motor 221 has moved the rod 62 against the swtich 225 and has returned it to the play position, the switch 249 being opened again by the projection 248. During this movement the guide surface 246 has again positioned the locking lever 241 against actuated by the engagement of the pin 65. The control circuit 224 now starts the tape-deck motor 3 again. The connecting member 52 is pivoted and the head-mounting plate 74 is advanced. Thus, the tape-transport direction is reversed by means of the control plate 88, as shown in FIGS. 5 and 6.

Depending on the direction, one of the fast-wind touch controls 264, 265, which are electically connected to the control circuit, is actuated for fast winding. Thus, the locking magnet 244 remains de-energized via the control circuit 224.

In the play position the command pin 257 is situated in the starting portion of a closed guide path 253. It is assumed that normal forward playing is effected in the range of change-over to fast winding. If the fast-wind touch control 268 is now touched, the control circuit 224 controls the servo motor 221 in such a way that the rod 62 is moved to the right (FIG. 8). The command pin 257 now enters one of the command paths. The pin then moves the actuating rod 33 to the right. At the same time the gear wheels shown in FIG. 1 are set to a position in which the tape is wound rapidly in the forward direction. By means of the oblique surfaces 35a, 35b the pins 74c, 74d are shifted, as a result of which the head-mounting plate 74 is withdrawn from the tape (FIG. 1). However, the travel of the plate 74 is shortened, so that the switch 267 is not actuated. Fast forward winding can be stopped by touching the play touch control 264. The rod 62 is moved back into the play position and the command pin 257 reaches the starting portion again. A spring 260 moves the actuating rod 33 to the left. The tape is now again played in the direction in which it was played before fast winding.

Figure 10:
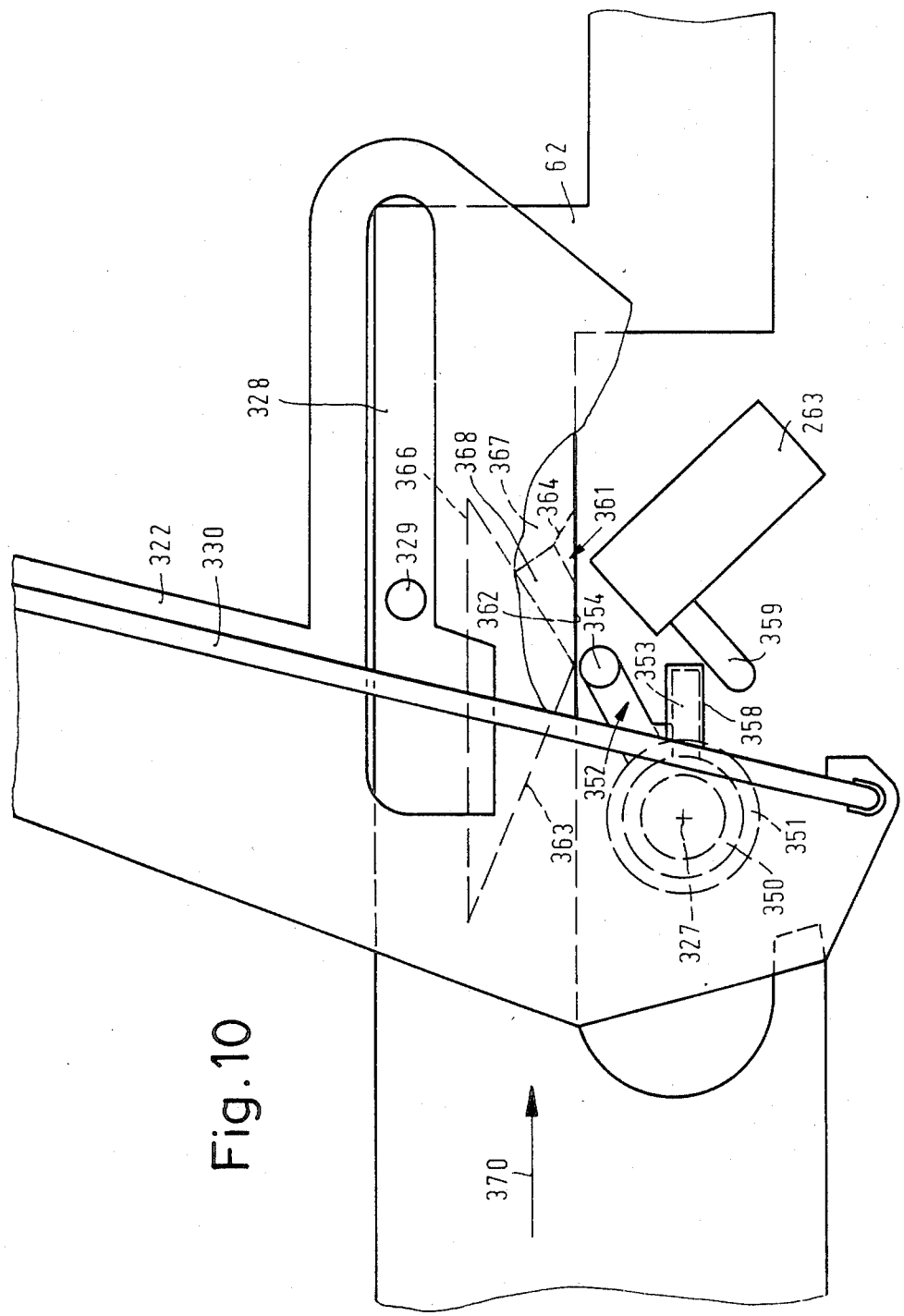

If fast reverse winding is required, the fast-wind touch control 269 should be touched. The control circuit 224 then supplies a command to the servo motor 221 to move the rod 62 to the left. The command pin 257 is now forced to enter another guide path and moves the actuating rod 34 to the right. The individual parts in FIG. 1 are now set to their positions for fast reverse winding and the edges 36a, 36b again abut against the pins 74c and 74d to withdraw the head-mounting plate from the tape. Fast reverse winding can be discontinued by touching the play touch control 264. The rod 62 moves back and the command pin 257 runs into the guide path 253 until it reaches the starting portion 270. Under the influence of the spring 261 the actuating rod 34 has followed the command pin 257 and has returned to the initial position. Playing is now continued in the original playing direction. When the play position is reached the control rod 62 and the transport lever 322 are in a position relative to each other as shown in FIG. 10. Both the switching projection 358 and the positioning projection 353 then abut against the switching arm 359. The follower arm 354 is positioned against the guide wall 362.

Ejection

When an electrical ejection touch control 271 is touched the latching magnet 244 is de-energized and the latching lever 241 is released. The head-mounting plate 74 is then withdrawn from the tape; the switch 267 is closed, and the tape-deck motor 3 is switched off. This ensures that the head is lifted off the tape and neither the tape nor the head can be damaged. The servo motor moves the rod 62 fully to the left, opposite the direction of cassette insertion. The command pin 257 then enters the third command path 256. The pin 329 returns into the guide slot 328 and is pressed against the spring 330.

Figure 11:
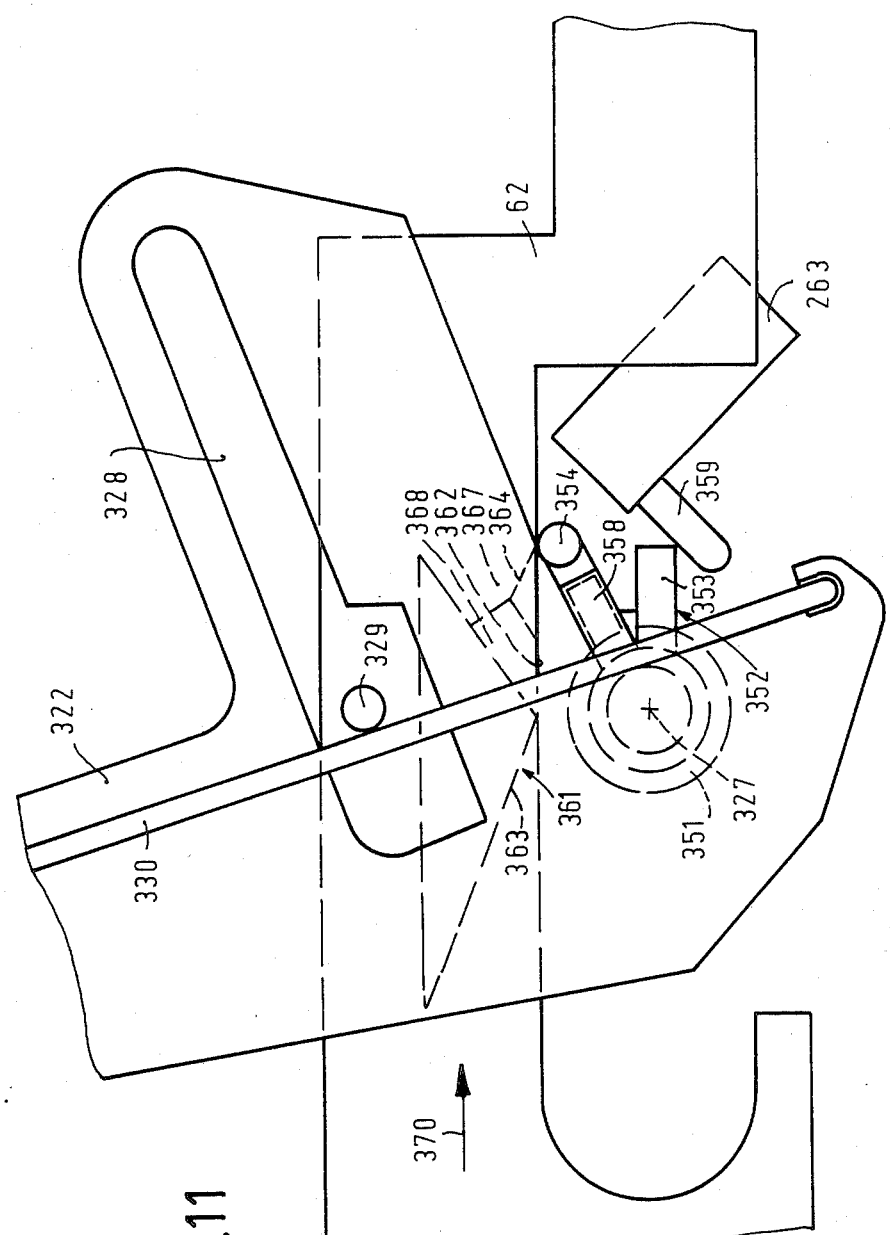
Figure 12:
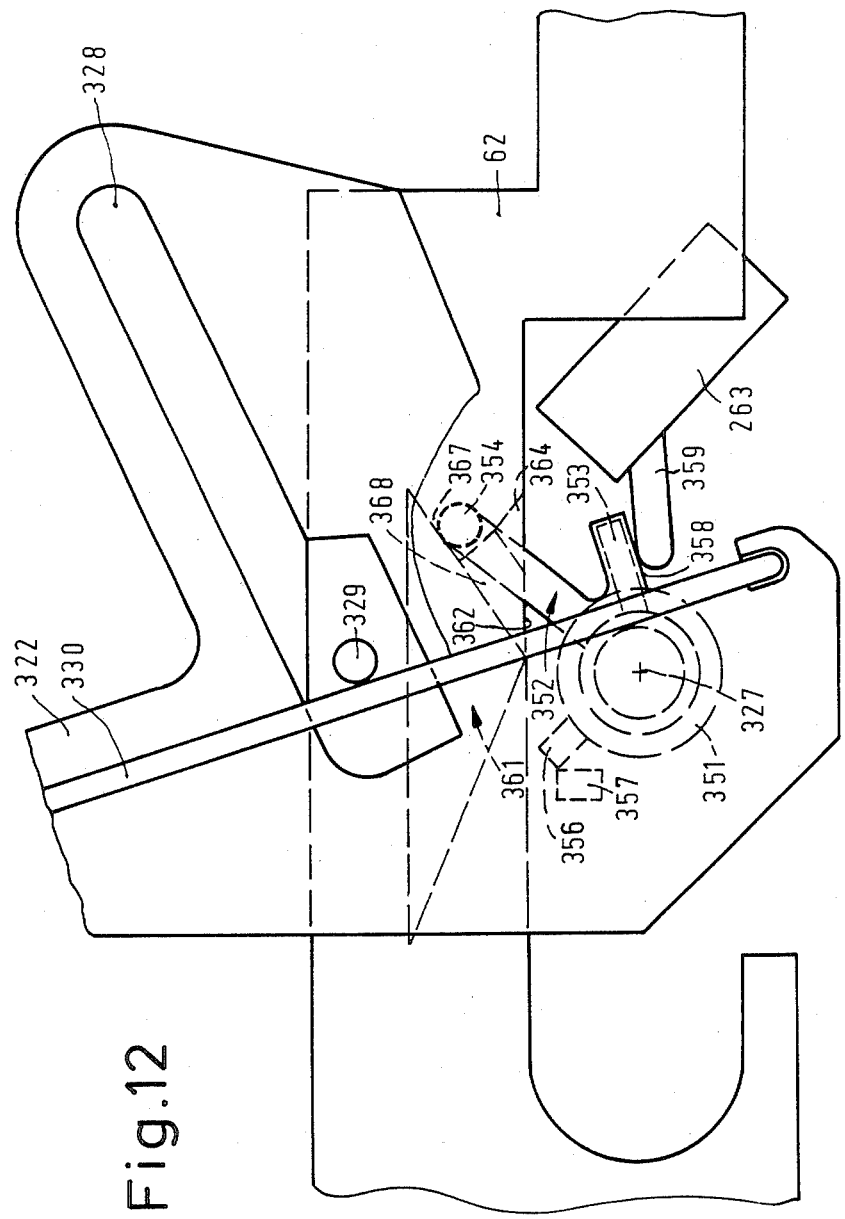

When the control rod 62 moves to the left in a direction opposite to that indicated by the arrow 370 (FIG. 10) the follower arm 354 follows the front portion 363 of the guide wall 362. FIG. 10 shows the position in which the pin 329 has not yet reached the spring 330 and in which the follower arm 354 is just situated on the transition between the inclined run-on surface 363 and the guide wall 362. If the control rod 62 is now moved further in a direction opposite to that indicated by the arrow 370 the pin 329 is pressed against the spring 330, causing the transport lever 322 to be pivoted counterclockwise. The switching projection 358 follows this movement and becomes disengaged from the switching arm 359, which is then only retained by the positioning projection 353. In the position shown in FIG. 11 the follower arm 354 is situated directly before the re-entrant portion 364. When the control rod 62 moves further in a direction opposite to that indicated by the arrow 370, the guide wall 362 moves with respect to the follower arm 354 until the wall is clear of and no longer abuts against this wall. As a result of its spring force the switching arm 359 then pivots the sleeve 351 about the hollow spindle 350, pressing the follower arm 354 into the re-entrant portion 364 via the positioning projection 353 until the arm 354 reaches a run-in area 367.

The switch 263 is thus opened automatically by means of its internal spring force. The servo motor 221 stops and the time delay between the disengagement of the switching projection 358 and the engagement of the follower arm in the re-entrant portion 364 ensures that the control rod has moved outwards far enough. This movement in a direction opposite to that indicated by the arrow 370 ensures that the pin 329 pivots the transport lever 322 so far counterclockwise that the cassette 332 is ejected far enough.

If again a cassette 332 is inserted, causing the transport lever 322 to be pivoted clockwise, the switching projection 358 closes the switch 263 via the switching arm 359. This results in the control rod 62 being moved in the direction indicated by the arrow 370. The follower arm 354 then moves from the run-in area 367 onto the inclined guide path 368 and pivots downward about the integral hinge 355. Because of the resilience of the integral hinge 355, the follower arm then springs back onto the guide wall 362 at the location of the portion 369 after having reached this guide wall. As the control rod 62 is moved further in the direction indicated by the arrow 370 the follower arm 354 performs a relative movement along the guide means 361 towards the inclined run-on surface 363, where it can be released. When the control rod moves back again it is re-engaged at the location of inclined guide surface.

What is claimed is:

1. A magnetic-tape-cassette apparatus, comprising:
a lever pivotally mounted in the apparatus for loading and ejecting a cassette inserted into the apparatus,
means for coupling said lever to the cassette, said lever and means being arranged such that said lever is pivoted in a loading direction during insertion of the cassette, and said cassette is ejected in response to pivoting of the lever in an ejection direction opposite said loading direction,
an axially movable control rod, motor means for moving said rod over a given travel in first and second directions, and means for pivoting said lever in said ejection direction responsive to movement of said rod over a first portion of said travel in said first direction,
an electrical switch having a switching arm movable between an activated and an inactivated position, and means for turning on and turning off said motor means responsive to movement of said arm to said activated and inactivated positions of said switch respectively, and
means for moving said switching arm to said activated position responsive to a cassette being inserted into a first position in which the lever has been pivoted in said loading direction partway from a loading position to an operating position,
characterized by comprising a position-sensing delay element, and means responsive to and including said position-sensing delay element for maintaining said switching arm in said activated position during ejection movement of said cassette past said first position to a second position, and turning said motor off when the cassette reaches the second position
whereby during ejection of a cassette said motor means is turned off only after the cassette has passed the position in which the motor is turned on during insertion.

2. An apparatus as claimed in claim 1, characterized in that said delay element directly senses the position of said rod.

3. An apparatus as claimed in claim 1, characterized in that said apparatus further includes a guide means, and said delay element comprises a follower arm moveable between a delay position and a release position,
during ejection said guide means engaging said follower arm to maintain the follower arm in the delayed position until the cassette has reached said second position,
said apparatus comprising means, operable when the cassette is in the second position, for biasing the follower arm from the delay position toward the release position, and for moving said switching arm to said inactivated position responsive to movement of the follower arm to the release position.

4. A magnetic-tape-cassette apparatus, comprising:
a lever pivotally mounted in the apparatus for loading and ejecting a cassette inserted into the apparatus,
means for coupling said lever to the cassette, said lever and means being arranged such that said lever is pivoted in a loading direction during insertion of the cassette, and said cassette is ejected in response to pivoting of the lever in an ejection direction opposite said loading direction,
an axially movable control rod, motor means for moving said rod over a given travel in first and second directions, and means for pivoting said lever in said ejection direction responsive to movement of said rod over a first portion of said travel in said first direction,
an electrical switch having a switching arm movable between an activated and an inactivated position, and means for turning on and turning off said motor means responsive to movement of said arm to said activated and inactivated positions of said switch respectively, and means for moving said switching arm to said activated position responsive to a cassette being inserted into a first position in which the lever has been pivoted in said loading direction partway from a loading position to an operating position, characterized by comprising guide means mounted to and moveable with said rod, and a position-sensing delay element for sensing a position of said rod, said guide means comprising a guide wall having a first portion extending in the direction of rod movement, and a re-entrant portion, said guide means and delay element being arranged such that during ejection movement said delay element engages said first portion until after the cassette has passed said first position, said delay element engaging said re-entrant portion and being released by said guide means when the cassette reaches the second position, and said apparatus includes means responsive to and including said position-sensing delay element for maintaining said switching arm in said activated position while the delay element is in the delay position, and turning said motor off when the delay element moves to the release position, and during a next movement of said rod in said second direction responsive to insertion of a cassette, the delay element is engaged by the re-entrant portion and returned to engagement with said guide wall first portion for returning the delay element to the delay position.

5. An apparatus as claimed in claim 4, characterized in that said delay element comprises a resiliently connected follower arm for engaging said guide means.

6. An apparatus as claimed in claim 5, characterized in that said delay element comprises a sleeve, a follower arm connected to the sleeve via an integral plastic hinge, and a positioning projection arranged for engaging said switching arm, said sleeve being rotatable about a pivot axis of said lever.

7. An apparatus as claimed in claim 6, characterized in that said apparatus comprises a stop, and said sleeve further includes a stop projection arranged such that, responsive to the delay element being released by said guide means, the stop projection engages the stop to align said follower arm with a run-in area of said guide means.

8. An apparatus as claimed in claim 7, characterized in that said switching arm is biased toward said positioning projection, for moving said follow arm to the release position.

9. An apparatus as claimed in claim 6, characterized in that said lever comprises a switching projection, and said switching arm is arranged for engagement by both said positioning projection and said switching projection upon pivoting of said lever in said loading direction during insertion, and engagement of said follower arm with said first portion, during ejection said delay element maintaining said positioning projection in contact with said switching arm after said switching projection is moved out of contact with said switching arm as the cassette passes said first position.

10. An apparatus as claimed in claim 9, characterized in that said means for pivoting said lever in said ejection direction comprises a pin on the control rod, said lever and pin being so arranged such that said control rod can be moved over a second portion of said travel different from said first portion without engagement of said follower arm with said re-entrant portion.

11. An apparatus as claimed in claim 5, characterized in that said apparatus comprises a stop, and said sleeve further includes a stop projection arranged such that, responsive to the delay element being released by said guide means, the stop projection engages the stop to align said follower arm with a run-in area of said guide means.

12. An apparatus as claimed in claim 7, characterized in that said switching arm is biased toward said positioning projection, for moving said follow arm to the release position.

13. An apparatus as claimed in claim 5, characterized in that said lever comprises a switching projection, and said switching arm is arranged for engagement by both said positioning projection and said switching projection upon pivoting of said lever in said loading direction during insertion, and engagement of said follower arm with said first portion, during ejection said delay element maintaining said positioning projection in contact with said switching arm after said switching projection is moved out of contact with said switching arm as the cassette passes said first position.

14. An apparatus as claimed in claim 13, charaterized in that said means for pivoting said lever in said ejection direction comprises a pin on the control rod, said lever and pin being so arranged such that said control rod can be moved over a second portion of said travel different from said first portion without engagement of said follower arm with said re-entrant portion.

15. An apparatus as claimed in claim 5, characterized in that said switching arm is biased toward said positioning projection, for moving said follow arm to the release position.

* * * * *